Jan. 17, 1967 R. C. ELWELL 3,298,751
GAS LUBRICATED BEARINGS
Filed April 30, 1964
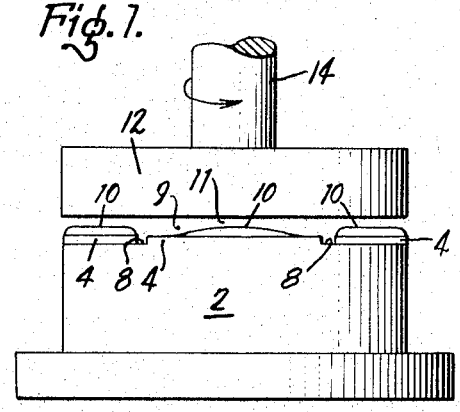
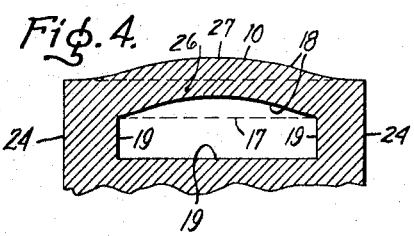
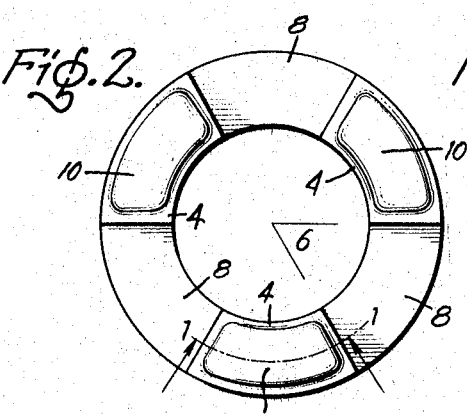
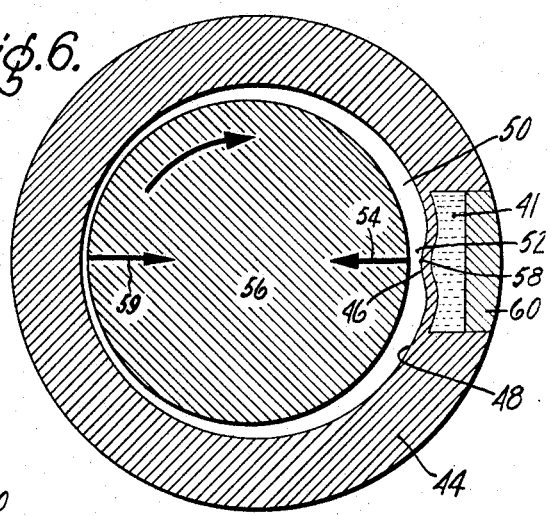
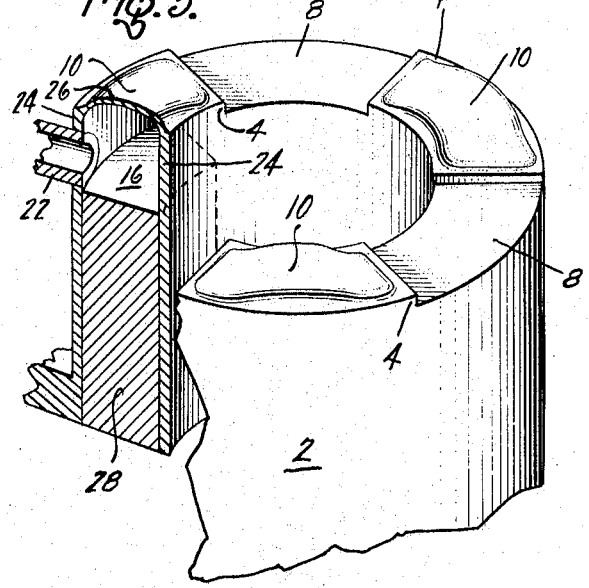
Inventor:
Richard C. Elwell
by Paul A. Frank
His Attorney United States Patent Office 3,298,751
Patented Jan. 17, 1967

3,298,751
GAS LUBRICATED BEARINGS
Richard C. Elwell, Scotia, N.Y., assignor to General
Electric Company, a corporation of New York
Filed Apr. 30, 1964, Ser. No. 363,697
7 Claims. (Cl. 308—9)

The present invention relates to gas bearings, and more particularly, to a gas lubricated bearing and a process for forming the same.

With the rapid advance in many technologies, apparatus is required to operate at increasingly higher speeds under varying load conditions. The need then arises for bearings that will operate for prolonged periods of time subject to these conditions without being prone to failure. Gas lubricated bearings as presently known, lack the ease of operation and simplicity of manufacture requisite for operation under these aforementioned conditions.

The basic principle of operation of gas bearings is that by providing a pressurized layer of gas between a rotating object and its bearing surface, the object is properly stabilized and prevented from contacting this bearing surface. This is usually accomplished by hinging the bearing faces so that they will deflect slightly and cause the gas passing between them and the rotating member to be pressurized by being subjected to this reduced area. This increase in pressure produces a force on the rotating member to provide the required bearing function. Gas bearings, now in use employ this hinged surface configuration or other movable configurations to achieve their successful operation. This difficulty inherent in these bearings is that the hinged or other movable configurations are difficult to fabricate accurately because of the required parts assembly operation, and difficult to operate at high speeds because of these same movable parts. Difficulty also arises when these bearings are operated under conditions where gravity is absent, since their effective operation relies on a gravity load. Presently, this is overcome by the use of an artificial load which requires the addition of extra equipment.

The principal object of the invention is the contruction of a gas bearing for high speed operation.

An object of the invention is to provide a method of forming a gas bearing surface that does not employ movable parts or members.

Another object of the invention is to provide a bearing surface which will accommodate varying loads.

A further object of the invention is to provide a bearing needing no outside loading under conditions of operation in the absence of gravity.

One of the features of the present invention is a gas bearing having a bearing block and bearing surfaces formed from the same unit of material, the surfaces being positioned to create a lifting force between the surfaces and a supported rotating member. In accordance with another feature of my invention, the surfaces are created by deflecting a portion of the bearing block.

The attached drawing illustrates preferred embodiments of the invention in which:

FIGURE 1 is a view of a bearing employing the present invention with its associated rotating runner;

FIGURE 2 is a plan view of the bearing shown in FIGURE 1 with the runner removed;

FIGURE 3 is a cut-away perspective view of the bearing shown in FIGURE 1;

FIGURE 4 is a cross-sectional view along line 4—4 of FIGURE 2;

FIGURE 5 is a cross-sectional view of another embodiment of the bearing surface of FIGURE 4;

FIGURE 6 is a view of a journal bearing embodying the present invention.

In FIGURE 1 there is shown a view of a thrust bearing employing the present invention. The construction includes bearing block 2 which has a plurality of arc shaped raised sectors, or shoes 4, around its circumference. Shoes 4 are disposed at equal central angles 6, FIGURE 2, from each other and are separated by lower flat areas 8 which terminate in bearing surfaces 10. Bearing block 2, the stationary part of the bearing assembly, is constructed of a single integral piece of material, thereby imparting simplicity of construction, assembly and maintenance, and the inherent advantage of having no moving parts to precipitate failure. Flat areas 8 are sufficiently lower than shoes 4 to avoid any interference between these flat areas and runner 12 which carries the thrust load. The main load being carried is transmitted by rotating shaft 14 through this runner 12 to the bearing surface.

Bearing surfaces 10 have a narrow slot or cavity 16, as shown by the area enclosed by dashed line 17 and solid line 19 in FIGURE 4, situated parallel to and beneath each bearing surface 10. Slots 16 are formed by being cast into the bearing block 2 as it is formed, or by being machined in from any of the sides of shoe 4, or as shown in FIGURE 3 by removing the material beneath shoe 4. The larger area thus formed may be partially closed, as by plug 28 (FIGURE 5) to impart sufficient strength to walls 24 remaining. Slot 16 is pressurized by pumping a medium such as a liquid or gas under pressure until the pressure increases to a point where bearing surface 10 expands as shown by the solid lines 18 in FIGURE 4. Top wall 26 of cavity 16 may be thinner than sides 24 of shoe 4 so that during pressurizing of cavity 16 this thinner side is the first to expand. Alternatively, the sides of shoe 4 may be reinforced by braces during the pressurizing operation so that even though they are the same thickness as top wall 26, only the latter expands under pressure. This pressurizing operation results in crown or bulge 26 forming on bearing surface 10. Because of the symmetry of cavity 16, bulge 26 resulting from the pressurizing is located in the center of the surface 10, thus permitting rotation of the bearing in either direction with equal results due to the equivalent slopes on either side of apex 26 of the bearing surface. Deflected bearing surface 10 can be made circular or parallel with respect to the axis of rotation of shaft 14 by construction of slot 16 in different shapes as will be subsequently described. Deflected bearing surface 10 is extremely small, being exaggerated for purposes of illustration.

The pressurizing medium is transmitted to cavity 16 by the insertion of a tube into the cavity as illustrated by tube 22 in cavity 16 or tube 33 in cavity 30 or by inserting the tube in any other convenient part of the slot. The position of the tube relative to the cavity is determined by the configuration of the particular bearing surface.

In operation, rotation of shaft 14 causes a thin film of gas to be brought between runner 12 and bearing block 2, this gas being dragged across surface 10 of shoe 4 in the same direction as the rotation of runner 12. As the gas film enters space 11 between bearing surface 10 and runner 12, its pressure rapidly increases due to the decrease in area 11 through which the gas travels. The gas first contacts the relatively large area 9 of bearing surface 10. As the gas travels further across bearing surface 10, the distance between bearing surface 10 due to bulge 26 and planar runner 12 is substantially lessened. This decrease in area causes a corresponding increase in pressure and lift sufficient to maintain the runner at a distance above bearing surface 10. Thus, as shaft 14 rotates, runner 12 is lifted and maintained at a distance above bearing surfaces 10 by the gas dragged across these same surfaces.

FIGURE 5 illustrates a bearing surface 34 in which slot 30 is asymmetric with respect to the center of shoe 4 so that upon pressurizing slot 30 off center crown 32 is formed on bearing surface 34. To effect this result, tapered slot 30 is machined as shown by broken line 36 so that wall 38 is thicker at 40, than at 42. As slot 30 is inflated, part 42 of wall 38 deflects the greatest amount and imparts the asymmetric deflection to bearing surface 34. The placement or shape of crown 32 can thus be controlled by the placement and shape of slot 30.

This embodiment operates in the same general manner as the previously described embodiment of FIGURE 4. The gas travels through a decreasing gap between inclined bearing surface 34 and the runner, until it reaches a maximum pressure slightly before it reaches the apex of crown 32 of the bearing surface. Crown 32 of bearing surface 34 being asymmetric with respect to shoe 31, permits the lifting force to be exerted over a greater surface area and in turn permits greater loads to be lifted with the same size bearing block.

Both aforementioned embodiments rely on the lift caused by the gas travelling through a gradually restricted area. If the shoes were flat, (non deflected) there would be no decrease in the area between the runner and the shoes and, thus no resulting lift. The gas between the bearing surfaces and the runner would be dissipated without achieving its bearing or lifting function and damage to the surfaces would result.

Deflections in the bearing surface may be either permanent, or elastic, depending on the application desired. Permanent deflection is desired, where there is very little or no change in the loading or vibration imparted to shaft 14. In such cases, crown 26 is imparted to the bearing surface and the pressure released, the material being selected to maintain this deflection. In operations subject to changing loads and requiring an elastic deflection, the material selected is one that maintains its deformation only while pressure is applied. Thus, in situations where the load varies or the shaft wobbles or vibrates, the elastic deflection can be changed in size and lift to meet changing conditions. In such situations specific pressure is imparted to cavity 16 for a specific application and during that application when a different pressure is needed it can be supplied from a pressure reservoir. Also, adjustment in the deflection for different applications can be provided. Thus my invention provides a bearing for situations where ordinary gas bearings would fail because of the lack of ability to adjust for varying loads.

While three shoes 4 with their related bearing surfaces 10 are illustrated, there may be a larger number of shoes and their related bearing surfaces, the limit being reached when they form a circumferential ring.

Another embodiment of the invention, as illustrated in FIGURE 6, includes a cavity 41 in journal bearing 44, the cavity being pressurized to cause deflection 46 in the inner surface 48 of the bearing. Deflection 46 causes the gas in annulus 50 surrounding the bearing to travel through restricted area 52 and increase the pressure in a manner similar to that of bearing surfaces 10 of the thrust bearing in FIGURES 1–4. As the gas travels through annulus 50 and comes into contact with the gradually restricted area caused by deflection 46 the pressure increases, reaching a maximum near apex 58 of deflection 46. This increased gas pressure exerts a force 54 on shaft 56, which force equalizes force 59 produced by the revolution of shaft 56 in bearing 44. Counterbalancing force 54 thereby imparts a stabilizing effect on shaft 56 and insures high speeds with maximum stability. If no stabilizing force were present, the shaft would wobble as it rotated and rapidly dissipate the gas film in a random direction. Without such gas, the shaft would eventually scrape against the sides of journal bearing 44 injuring both the shaft and bearing. This method of applying the stabilizing force as part of the bearing itself obviates the need for an externally applied force, as presently required in the operation of gas bearings.

The method of pressurizing cavity 41 is essentially the same as with the thrust bearing previously described. The deflection obtained permits rotation of the shaft in either direction, since it is symmetric with respect to cavity 41. If unidirectional rotation with greater loading is desired, an asymmetric deflection such as that described in FIGURE 5 would be used. Thus, this journal bearing by providing its own loading can operate under conditions where no external load is present, such as in missiles and satellites where there is no gravity load.

A plurailty of cavities 41 may be placed at different locations around the shaft 56 depending on the type of shaft, the speeds involved, and the external forces exerted on the shaft. Also when shaft 56 is lightly loaded by an outside force, which is not sufficient to counterbalance the rotational force of the shaft, as in a steam turbine, this invention may be employed to add a stabilizing force on shaft 56 to produce an overall force sufficient for proper operation. As previously described with the thrust bearings of FIGURES 1–5, the deflection may be permanent or adjustable (elastic) depending on the material used for the bearing and the application involved. As in the case of the thrust bearing the deflection may be imparted by any pressurizing medium such as liquids and gases.

The present invention recognizes both the effects of high speeds and varying loads on the operation of bearings and solves the problems incident thereto with a bearing which employs a minimum of parts in a highly efficient manner.

While I have described a preferred embodiment of my invention, it will be understood that my invention is not limited thereto, since it may be otherwise embodied with the scope of the appended claims.

What I claim as new and desire to secure by Letters Patent of the United States is:

1. A bearing comprising
   stationary means for guiding a rotating member,
   means defining a space between said stationary means and said rotating member for the passage of a lubricant streaming in the general direction of rotation of said rotating member and,
   a projection made of flexible material and having a cavity thereunder for imparting pressure thereto, said projection being fixed to and extending near the rim of said stationary means and having a plurality of points at and near which the clearance between the bearing surface of the rotating member and the bearing surface of the stationary means is about a maximum and having a plurality of other points downstream of the maximum clearance at and near which the clearance between them approximates a minimum value whereby the streaming lubricant is under greater pressure at said points of minimum clearance than at said points of maximum clearance.

2. A bearing according to claim 1 in which pressurizing means are provided for imparting a greater or lesser pressure to the cavity under said projection so that said points of minimum clearance will extend a greater or lesser distance above said stationary means.

3. A thrust bearing comprising
   stationary means for supporting a rotating member,
   means defining a space between said stationary means and said rotating member for the passage of a lubricant streaming in the general direction of rotation of said rotation member,
   a plurality of bearing surfaces in said stationary means, and
   a plurality of projections each emanating from one of said bearing surfaces and made of flexible material having a cavity therein for imparting pressure thereto said projections being fixed to and extending near the rim of said stationary means and each projection having a plurality of points at and near which the clearance between the bearing surface of the rotating member and the bearing surface of the stationary means is about a maximum and having a plurality of other points downstream of the maximum clearance at and near which the clearance between them approximates a minimum value.

4. A thrust bearing according to claim 3 in which each of said projections is asymmetric with respect to the center of each said bearing surfaces.

5. A thrust bearing according to claim 3 in which pressurizing means are provided for conducting pressurized fluid to said cavity to vary the pressure in said cavity whereby the points of minimum clearance of said surfaces will be greater or lesser depending on the degree of pressure in said cavity.

6. A journal bearing comprising
stationary means for supporting a rotating member,
means defining an annular space between said stationary means and said rotating member for the passage of a lubricant in the general direction of the rotation of said rotating member, and
a rounded projection in the direction of rotation and being fixed to one section of said stationary means and extending into said space for pressurizing said lubricant to impart a stabilizing force to said rotating member said projection being of resilient material and inflatable to higher and lower positions with respect to the rest of said bearing surface.

7. A journal bearing according to claim 6 in which pressurizing means is provided for varying the magnitude of said projection.

References Cited by the Examiner

UNITED STATES PATENTS

| 1,117,500 | 11/1914 | Kingsbury | 308—160 |
|---|---|---|---|
| 1,236,511 | 8/1917 | Waring | 308—160 |
| 1,425,979 | 8/1922 | Kingsbury | 308—160 |
| 2,584,770 | 2/1952 | Wilcock | 308—9 |
| 2,873,683 | 2/1959 | Sherwood | 308—9 |
| 3,174,809 | 3/1965 | Mackie | 308—9 |

FOREIGN PATENTS 74,991   7/1917   Austria.

MARTIN P. SCHWADRON, *Primary Examiner.*

FRANK SUSKO, *Examiner.*

DAVID J. WILLIAMOWSKY, *Assistant Examiner.*